May 6, 1947.     F. C. RANSOM     2,420,191
BOTTLE HOLDER
Filed Sept. 1, 1945
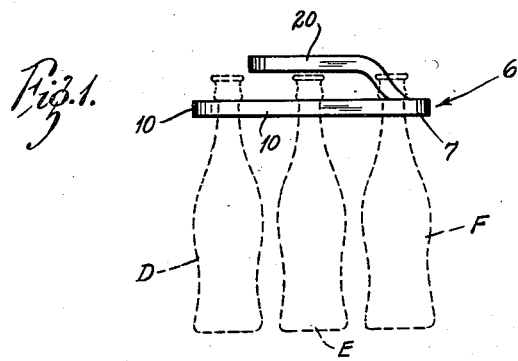
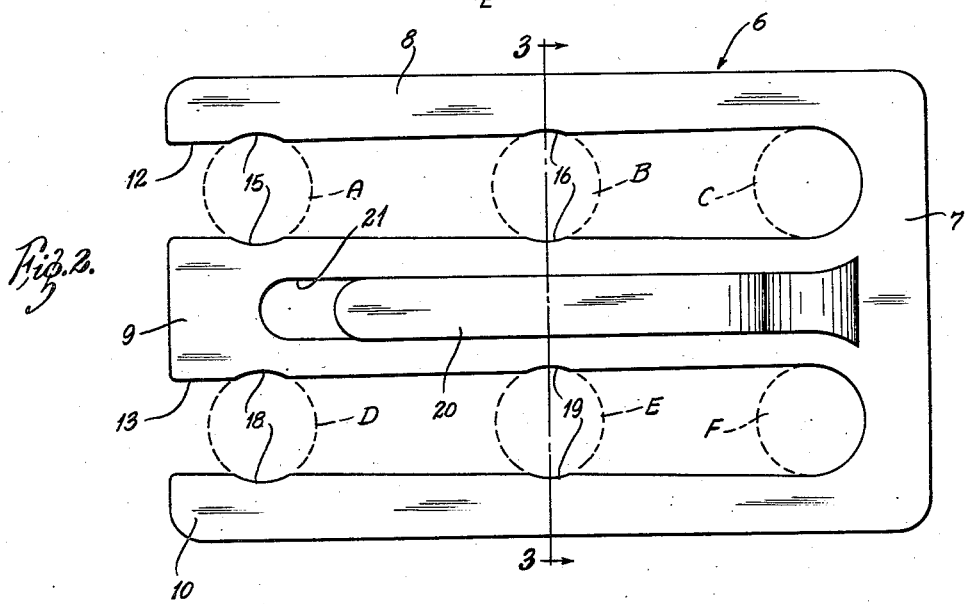
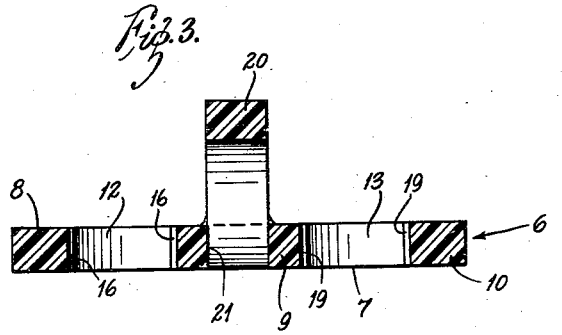
INVENTOR:
FRANCES C. RANSOM,
BY Kingsland Rogers & Ezell
ATTORNEYS.

Patented May 6, 1947

2,420,191

UNITED STATES PATENT OFFICE 2,420,191

BOTTLE HOLDER

Frances C. Ransom, University City, Mo.

Application September 1, 1945, Serial No. 614,027

6 Claims. (Cl. 224—45)

The present invention relates to a bottle holder. More particularly, it comprises a holder by means of which a plurality of bottles, such as soda bottles, may be conveniently carried in one hand.

It is an object of the invention to provide a holder of this kind formed of a single piece of material having incorporated within it the means to hold securely several bottles, and to provide a handle by means of which the holder may be carried with the bottles supported on it.

A further object is to provide a holder of this kind that may be made by a single molding of such material as a plastic material. A further object is to provide a holder made in such fashion which is designed to receive the bottles readily and to hold them securely and somewhat resiliently.

In the drawings:

Fig. 1 is a side elevation of the holder showing bottles in place in it, the bottles being designated by dotted lines;

Fig. 2 is a top plan view of the holder, shown in Fig. 1; and

Fig. 3 is a transverse section taken on the line 3—3 of Fig. 2.

The holder comprises a single piece of material, generally indicated at 6. This material is preferably a piece of plastic material, although it will be understood that the holder may be made of other substances. Plastic offers the advantage of simplicity of manufacture by a single molding operation, coupled with adequate strength, resiliency and durability.

One end of the piece 6 may be designated as a base 7. From this end, a plurality of arms 8, 9 and 10 project to give the overall device, in its illustrated embodiment, the general form of a rectangle. It will be evident that other forms may be adopted. Also, while it is preferable to have the arms project from one side, they may project from opposite sides, or be otherwise arranged to attain the objectives hereof.

The two arms 8 and 9 are separated by a notch 12; and the two arms 9 and 10 are separated by a notch 13. The notches are preferably slightly tapered so as to be narrower at their open ends than at their closed or bottom ends adjacent the base 7. The notch 12 may be provided with indentations 15 to receive a bottle A; indentations 16 to receive a bottle B. It is not ordinarily necessary to provide indentations at the base where the bottle C will be held.

Similarly, the notch 13 has indentations 18 to receive a bottle D, indentations 19 to receive a bottle E, and it also may receive a bottle F.

The middle arm 9 has integrally formed therefrom a handle 20. This handle, in its preferred form, joins the base 7 at one end, extends upwardly therefrom and then outwardly toward the open end of the holder. The arm 9 may have an opening 21 from which the material of the handle 20 may be derived. In the case of a molded holder, the opening 21 provides a means to save material. In the case of a stamped holder, the handle will be derived from this middle arm 9, leaving the opening 21.

In the use of the device, any suitable number of the bottles may be inserted in the openings and held by their finished portions, as shown in Fig. 1. The resiliency of the arms and the taper of the slots causes the bottles to be held securely.

It will be seen that this holder is very simple in construction and yet provides a stable device for holding bottles. It occupies only a small space and may be easily and cheaply manufactured. The handle 20 offers a convenient means of carrying the holder with the bottles in it. The notches prevent the bottles from slipping endwise accidentally.

What is claimed is:

1. A holder for bottles or the like comprising a single piece of generally flat material having a base from which a plurality of arms extend, said base and arms providing a plurality of notches extending inwardly from one edge of the device, said notches being shaped to receive the necks of bottles, one of said arms having a handle integrally formed therewith, said handle extending upwardly and outwardly toward the open end of the device, so as to lie above the top thereof.

2. A bottle holder formed of a single piece of generally flat material, said bottle holder having two notches extending inwardly from the periphery thereof, said notches dividing the material into three integral sections in the form of two outer arms and an inner section between the arms, a handle extending upwardly from the top surface of the middle section and formed integrally therewith, said notches being of a size to receive the necks of bottles and to support the bottles.

3. A bottle holder formed of a single piece of generally flat material, said bottle holder having two notches extending inwardly from the periphery thereof, said notches dividing the material into three integral sections in the form of two outer arms and an inner section between the arms, a handle extending upwardly from the top surface of the middle section and formed integrally therewith, said notches being of a size to receive the necks of bottles and to support the bottles, said outer arms being resilient so as to be displaceable, said notches being somewhat narrower than the necks of the bottles, whereby the arms resiliently hold the bottles in position.

4. A bottle holder formed of a single piece of generally flat material, said bottle holder having two notches extending inwardly from the periphery thereof, said notches dividing the material into three integral sections in the form of two outer arms and an inner section between the arms, a handle extending upwardly from the top surface of the middle section and formed integrally therewith, said notches being of a size to receive the necks of bottles and to support the bottles by their finishes, said outer arms being resilient so as to be displaceable, said notches being somewhat narrower than the necks of the bottles, whereby the arms resiliently hold the bottles in position, said notches having indentations on their edges in which the bottles may engage and be secured.

5. A bottle holder formed of a single piece of generally flat material, said bottle holder having two notches extending inwardly from the periphery thereof, said notches dividing the material into three integral sections in the form of two outer arms and an inner section between the arms, a handle extending upwardly from the top surface of the middle section and formed integrally therewith, said notches being of a size to receive the necks of bottles and to support the bottles by their finishes, said outer arms being resilient so as to be displaceable, said notches being somewhat narrower than the necks of the bottles, whereby the arms resiliently hold the bottles in position, an opening in the middle section from which the material of the handle may be derived.

6. A bottle holder comprising a unitary, generally flat piece of self-supporting material such as plastic, having an upper surface, a pair of bottle neck receiving slots in said material dividing the material into three integral sections consisting of two outer arms and a middle section, the slots being symmetrically arranged on opposite sides of the middle portion of the material, said slots having portions to engage bottles at their necks and to support them thereby, and holding means formed integrally with said middle portion and upstanding from the upper surface thereof.

FRANCES C. RANSOM.

REFERENCES CITED

The following references are of record in the file of this patent:

UNITED STATES PATENTS

| Number | Name | Date |
|---|---|---|
| 2,057,946 | Harris | Oct. 20, 1936 |
| 2,067,124 | Hoffman | Jan. 5, 1937 |
| 2,355,004 | McCulloch | Aug. 1, 1944 |
| 2,359,539 | Decher | Oct. 3, 1944 |
| 2,378,026 | Morgan | June 12, 1945 |